(12) United States Patent
Fox et al.

(10) Patent No.: US 7,723,463 B2
(45) Date of Patent: May 25, 2010

(54) POLYPHOSPHAZINE-BASED POLYMER MATERIALS

(75) Inventors: Robert V. Fox, Idaho Falls, ID (US); Recep Avci, Bozeman, MT (US); Gary S. Groenewold, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 974 days.

(21) Appl. No.: 11/279,414

(22) Filed: Apr. 12, 2006

(65) Prior Publication Data

US 2007/0240733 A1 Oct. 18, 2007

(51) Int. Cl.
*C08G 79/02* (2006.01)
(52) U.S. Cl. ..................................... 528/399
(58) Field of Classification Search .................. 528/399
See application file for complete search history.

(56) References Cited

U.S. PATENT DOCUMENTS

| | | | |
|---|---|---|---|
| 4,586,962 A | 5/1986 | Barabas | |
| 4,844,947 A | 7/1989 | Kasner et al. | |
| 4,959,442 A | 9/1990 | Ohkawa et al. | |
| 5,302,211 A | 4/1994 | Bunger et al. | |
| 5,421,906 A | 6/1995 | Borah | |
| 5,434,331 A | 7/1995 | Barkatt et al. | |
| 5,464,932 A | 11/1995 | Allcock et al. | |
| 5,512,202 A | 4/1996 | Borah | |
| 5,548,060 A | 8/1996 | Allcock et al. | |
| 5,666,641 A | 9/1997 | Abney et al. | |
| 5,728,660 A | 3/1998 | Borah | |
| 5,763,734 A | 6/1998 | Nachtman et al. | |
| 5,779,811 A | 7/1998 | Machii et al. | |
| 5,868,840 A | 2/1999 | Klein, II et al. | |
| 5,961,736 A | 10/1999 | Borah et al. | |
| 6,093,758 A | 7/2000 | Allcock et al. | |
| 6,263,989 B1 | 7/2001 | Won | |
| 6,431,296 B1 | 8/2002 | Won | |
| 6,535,793 B2 | 3/2003 | Allard | |
| 6,876,125 B2 | 4/2005 | Basheer et al. | |
| 2004/0033406 A1 | 2/2004 | Andrianov et al. | |
| 2005/0107274 A1 | 5/2005 | Daviot | |

FOREIGN PATENT DOCUMENTS

| | | |
|---|---|---|
| WO | 93/12468 A1 | 6/1993 |
| WO | 95/32736 A1 | 12/1995 |

OTHER PUBLICATIONS

International Preliminary Report on Patentability and Written Opinion of the International Searching Authority, dated Oct. 14, 2008, International Application No. PCT/US2007/066139, International Filing Date Apr. 6, 2007.
"Encyclopedia of Polymer Science and Engineering," vol. 13, John Wiley & Sons, pp. 31-41 (1988).
Groenewold et al., "Characterization of Interlayer Cs+ in Clay Samples Using Secondary Ion Mass Spectrometry with Laser Sample Modification," Anal. Chem., vol. 75, No. 10, May 15, 2004 (pp. 2893-2901).
Groenewold et al., "Laser-Assisted SIMS of Metal-Contaminated Minerals," Ineel, Idaho Falls, ID, (date unknown) 2 pages.
Groenewold et al., "Laser-Assisted SIMS of Contaminated Soil Particles," 2002 Subsurface Science Symposium, Boise, Idaho, 2002, 27 pages.
Karahan, Mehmet Cem, "Laser-Assisted Secondary Ion Mass Spectroscopy and its Applications in Practical Surface Analysis," Montana State University, Jul. 2004, 94 pages.

*Primary Examiner*—Bernard Lipman
(74) *Attorney, Agent, or Firm*—TraskBritt

(57) ABSTRACT

Methods of removing contaminant matter from porous materials include applying a polymer material to a contaminated surface, irradiating the contaminated surface to cause redistribution of contaminant matter, and removing at least a portion of the polymer material from the surface. Systems for decontaminating a contaminated structure comprising porous material include a radiation device configured to emit electromagnetic radiation toward a surface of a structure, and at least one spray device configured to apply a capture material onto the surface of the structure. Polymer materials that can be used in such methods and systems include polyphosphazine-based polymer materials having polyphosphazine backbone segments and side chain groups that include selected functional groups. The selected functional groups may include iminos, oximes, carboxylates, sulfonates, β-diketones, phosphine sulfides, phosphates, phosphites, phosphonates, phosphinates, phosphine oxides, monothio phosphinic acids, and dithio phosphinic acids.

9 Claims, 10 Drawing Sheets

US 7,723,463 B2

POLYPHOSPHAZINE-BASED POLYMER MATERIALS

CONTRACTUAL ORIGIN OF THE INVENTION

This invention was made with government support under Contract No. DE-AC07-05ID14517 awarded by the United States Department of Energy. The government has certain rights in this invention.

BACKGROUND OF THE INVENTION

1. Field of the Invention

The present invention relates generally to methods and systems for removing contaminant matter from natural and man-made porous materials including, for example, cement, asphalt, tile, granite, marble, and other stone materials. The present invention also relates to polymer materials that may be used in conjunction with such methods and systems to remove contaminant matter from such materials.

2. State of the Art

Natural and man-made porous materials and structures employing such materials may become contaminated with contaminant matter, such as radionuclides of uranium, plutonium, americium, californium, radium, iridium, cesium, strontium, and cobalt (as well as other fission products of such radionuclides), due to radioactive waste disposal and storage activities, unintentional leakage of radioactive waste, and fallout from atmospheric releases of radioactive material. For example, cement or asphalt roadways may be contaminated with radionuclides due to unintentional spills that occur during transportation of radioactive waste material from a waste generation site to a waste storage site. As another example, surfaces of buildings, monuments, bridges or other manmade structures that are formed from or are surfaced with porous materials, such as brick, cement, granite, marble, and other stone materials, could be contaminated with radionuclides upon the detonation of a "dirty" bomb (a bomb that includes radioactive material) such as might be detonated in an urban setting.

In events such as those described above, the contaminated structures and exposed surfaces of materials of such structures may need to be decontaminated before persons are allowed within the vicinity of the contaminated area and prior to resuming use of contaminated structures and proximity to surfaces thereof. When contaminated structures include porous materials (such as, for example, cement, asphalt, granite, marble, and other stone materials), at least some of the contaminant radionuclides may be deposited within pores, cracks, vugs and/or voids that extend into the porous materials from the exterior surfaces thereof. Contaminant radionuclides deposited within such pores, cracks, and/or voids may be relatively difficult to remove from the porous material, thereby complicating the decontamination process for such structures.

Furthermore, when contaminant radionuclides are deposited on a structure that includes a porous material, the radionuclides may become more tightly bound to the porous material with the passage of time, as the radionuclides migrate deeper within the pores, cracks, vugs and/or voids of the porous material and form surface complexes with the substrate materials surrounding such pores, cracks, and/or voids. Therefore, it may be necessary or desirable to remove radionuclides from contaminated structures and materials as soon as possible after a contaminating event. However, access to contaminated areas by decontamination personnel may be delayed for a period of time after such a contaminating event. For example, access to contaminated areas by decontamination personnel may be delayed until after emergency response personnel have evacuated and secured the contaminated area, and identified the nature and extent of the contamination. Such delays of access to contaminated areas by decontamination personnel may exacerbate the problem associated with the increasing difficulty of removing radionuclides from porous materials and structures with the passage of time.

One method for removing radionuclides from porous materials is described in U.S. Pat. No. 5,421,906 to Borah. The method involves applying a precleaning aqueous fluid to a contaminated surface, rinsing the precleaning fluid from the surface with water or a solution of water and sodium citrate, applying an aqueous extraction fluid to the contaminated surface, and washing the extraction fluid from the surface. The precleaning aqueous fluid comprises from about 4 to about 10 wt. % sulfamic acid, from about 5 to about 10 wt. % hydrofluoric ammonium bifluoride, from about 2 to about 4 wt. % hydrochloric acid, about 1 to about 4 wt. % surfactant, about 6 to about 12 wt. % sodium citrate, about 2 to about 5 wt. % oxalic acid, about 10 to about 20 wt. % triethanolamine; and, optionally, about 1 to about 2 wt. % d-limonine. The aqueous extraction fluid comprises about 5 to about 8 wt. % surfactant, about 4 to about 8 wt. % of an emulsifier containing quaternary amines, isopropyl alcohol and glycerine, about 15 to about 20 wt. % ethylene diamine tetracetic acid, about 5 to about 10 wt. % ethylene glycol monobutyl ether, about 4 to about 8 wt. % of a chemical pH buffer agent, about 4 to about 8 wt. % triethanolamine, and about 4 to about 10 wt. % of a composition selected from the group consisting of ethylene-bis(oxyethylenenitrilo)-tetracetic acid, 1,2 diamino-cyclohexane-tetracetic acid, hydroxyethylene diamine tetracetic acid, nitrilotriacetic acid and sodium gluconate.

Another method for removing radionuclides from porous materials is described in U.S. Pat. No. 5,763,734 to Nachtman et al. The method involves applying polyurea elastomers, other isocyanate plural component systems, polyurethanes, polyamides, latex, or mixtures thereof, at a temperature of at least about 100° F., to a contaminated substrate, and then removing the applied material to remove contaminants from the substrate.

BRIEF SUMMARY OF THE INVENTION

In one embodiment, the present invention includes a polyphosphazine-based polymer material that may be used to decontaminate a contaminated structure that includes a porous material. The polyphosphazine-based polymer material includes a plurality of polyphosphazine molecular segments. The polyphosphazine molecular segments have side groups, which may include functional groups having a chemical structure represented by at least one of the following chemical functional groups:

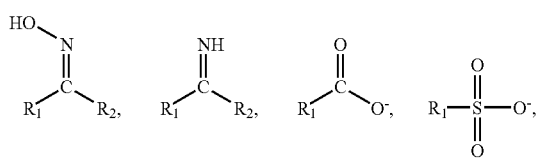

-continued

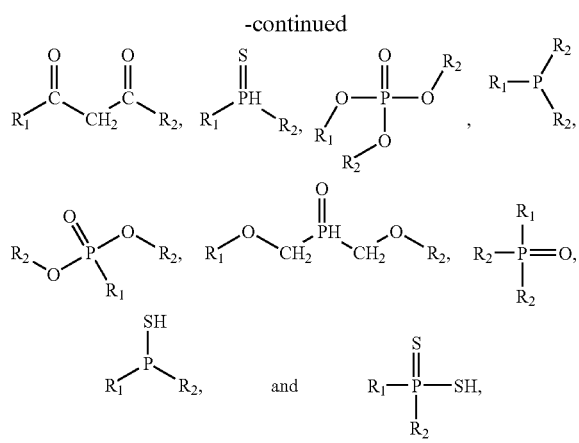

wherein $R_1$ represents a phosphorous atom of a polyphosphazine backbone or a plurality of atoms providing a covalently bonded link to a phosphorous atom of a polyphosphazine backbone, and wherein $R_2$ comprises additional chemical structure. The polymer material may also be termed a "capture material" herein, although suitable capture materials are not so limited.

In another embodiment, the present invention includes a method of removing contaminant matter from a porous material. The method includes applying a polymer material (such term including polymer material precursors) to a surface of a porous material comprising contaminant matter in at least one pore thereof, irradiating the surface of the porous material with electromagnetic radiation either before or after the polymer material is applied, and removing at least a portion of the polymer material in a cured state and having contaminant matter physically, chemically or atomically bound thereto from the surface of the porous material. Irradiating the surface of the porous material may cause redistribution of the contaminant matter to enhance removal thereof by the polymer material. A reagent may, optionally, be applied to the surface of the porous material prior to irradiation to enhance the desired redistribution of the contaminant matter.

In yet another embodiment, the present invention includes a system for decontaminating a contaminated structure comprising porous material. The system includes at least one radiation device configured to emit electromagnetic radiation toward a surface of a contaminated structure, and at least one spray device configured to apply a capture material onto the surface of the contaminated structure. Such capture materials may include polymer materials or small molecules that are capable of binding to a radionuclide. Capture materials may bind to a radionuclide by, for example, forming a chemical complex therewith. The chemical complex formed between the capture material and the radionuclide may facilitate removal of the radionuclide from a contaminated structure.

BRIEF DESCRIPTION OF THE DRAWINGS

While the specification concludes with claims particularly pointing out and distinctly claiming that which is regarded as the present invention, various features and advantages of this invention may be more readily ascertained from the following description of the invention when read in conjunction with the accompanying drawings, in which:

DETAILED DESCRIPTION OF THE INVENTION

As used herein, the term "porous material" means any material that includes one or more of pores, cracks, fissures, vugs and voids extending into the material from external surfaces thereof. Further, the term "pore" includes and encompasses cracks, fissures, vugs and voids. Porous materials may include, for example, concrete, alumino-silicates, metals, minerals, polymers, ceramics, composites, asphalt, brick, mortar, and all types of architectural and structural stone, so long as such materials include one or more of pores, cracks, fissures, or voids extending into the material from external surfaces thereof.

Figure 1:
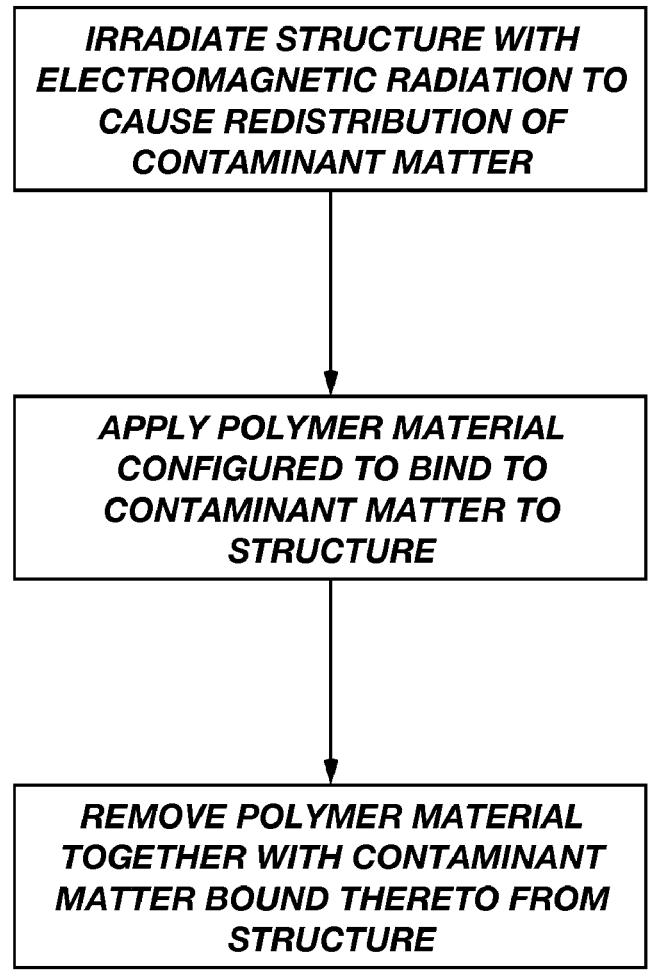
FIG. 1 is a flow chart illustrating an example of a method that embodies teachings of the present invention and that may be used to remove contaminant matter from a porous material.

An example of a method that embodies teachings of the present invention and that may be used to remove contaminant matter from a porous material will be described with reference to FIG. 1 and FIGS. 2A-2F. FIG. 1 is a flow chart that illustrates acts of the method. As shown therein, the method involves irradiating a contaminated structure with electromagnetic radiation to cause redistribution of contaminant matter, applying a polymer material to the structure that is configured to bind to the contaminant matter, and removing the polymer material together with contaminant matter bound thereto from the structure. This process will be described in further detail with reference to FIGS. 2A-2F.

Figure 2A:
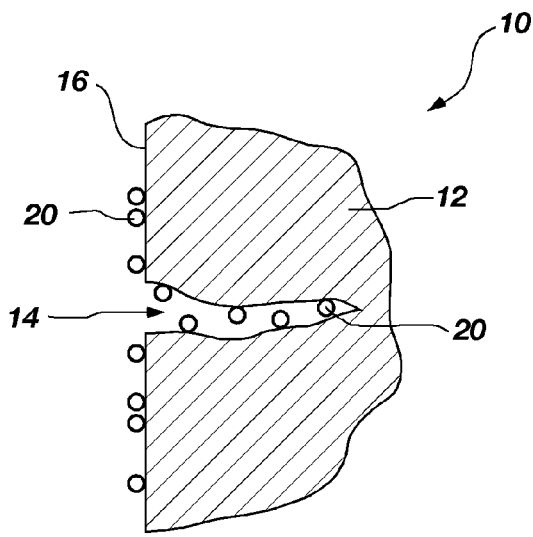
FIGS. 2A-2F illustrate an example of various acts in the process represented by the flow chart shown in FIG. 1.

FIG. 2A is a partial cross-sectional view of a structure 10 that includes a porous material 12. By way of example and not limitation, the structure 10 may include masonry of a building, a sidewalk, a road, monument, or other urban structure, and the porous material 12 may include cement, asphalt, tile, granite, marble, or any other porous material. A fissure or crack 14 is shown, which extends into the porous material 12 from a surface 16 of the structure 10. It is understood that the structure 10 may include pores or voids of any shape or configuration that extend into the porous material 12 from the surface 16 in addition to, or instead of, cracks 14.

Atoms, molecules, or larger particles of contaminant matter 20 may be disposed on the surface 16 of the structure 10 and within the crack 14 extending into the porous material 12, as shown in FIG. 2A. By way of example and not limitation, the contaminant matter 20 may include a metal (including Group I metals, Group II metals, transition metals, lanthanide series metals, and actinide series metals). Furthermore, the contaminant matter 20 may include a metal that is a radionuclide such as, for example, uranium, plutonium, americium, californium, radium, iridium, cesium, strontium, and cobalt (as well as fission products of such radionuclides).

Figure 2B:
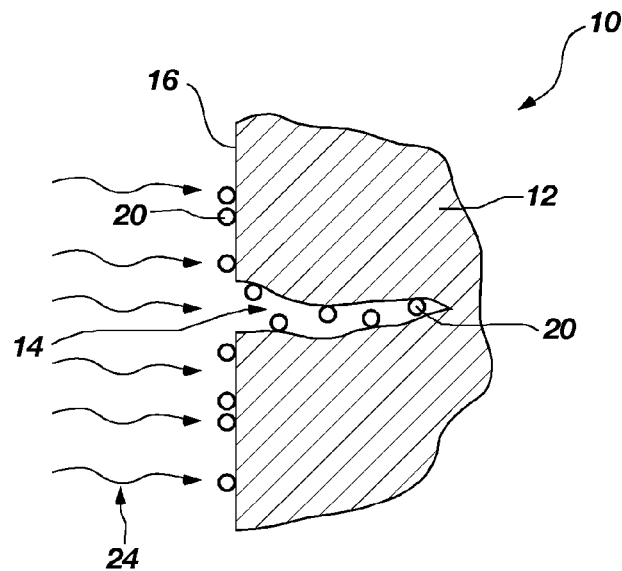
Figure 2C:
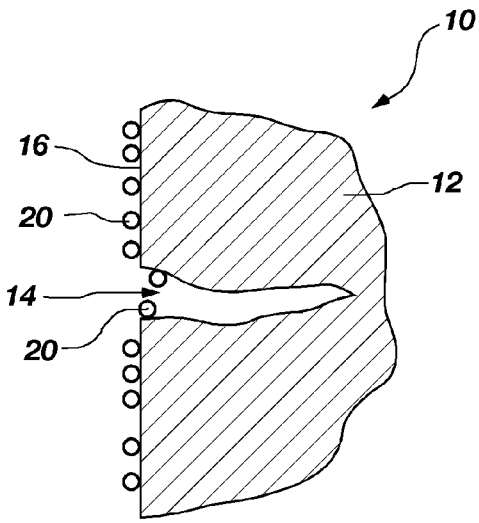

Referring to FIG. 2B, to decontaminate the structure 10, the structure 10 may be irradiated with electromagnetic radiation 24 to cause redistribution of the contaminant matter 20. In other words, irradiation of the structure 10 may cause at least some of the contaminant matter 20 within the crack 14 to move in a direction generally toward the surface 16 of the structure 10, as shown in FIG. 2C. Furthermore, at least some contaminant matter 20 initially within the crack 14 may be transported to and deposited on the surface 16 of the structure 10 upon redistribution.

The irradiation process may be nondestructive. In other words, irradiation of the structure 10 with electromagnetic radiation 24 may not cause significant ablation of the porous material 12. More particularly, the power of the electromagnetic radiation 24 impinging on the structure 10 may be below an ablation power threshold of the porous material 12. The ablation power threshold of the porous material 12 may be defined as the power per unit area applied to a surface, above which applied power per unit area significant (e.g., perceptible) ablation of the material 12 defining the surface occurs when the electromagnetic radiation 24 impinges on the material 12. Furthermore, the power of the electromagnetic radiation 24 may be selectively tailored to provide a selected level of redistribution of the contaminant material 20 while providing a maximum acceptable level of ablation of the porous material 12. As an example, the power of the electromagnetic radiation 24 may be adjusted to a level just below an ablation power threshold of the porous material 12.

By way of example and not limitation, the surface 16 of the structure 10 may be irradiated with electromagnetic radiation 24 having a wavelength or wavelengths in a range extending from about 200 nanometers to about 25 centimeters. Furthermore, the structure 10 may be irradiated with a beam of substantially coherent electromagnetic radiation 24, such as that emitted by laser or maser devices. For example, a laser device configured to emit a beam of substantially coherent electromagnetic radiation 24 having a wavelength in a range extending from about 200 nanometers to about 2500 nanometers may be used to irradiate the surface 16 of the structure 10. As another example, a carbon dioxide laser configured to emit a beam of substantially coherent electromagnetic radiation 24 having a wavelength in a range extending from about 9 microns to about 11 microns may be used to irradiate the surface 16 of the structure 10. Furthermore, laser devices emitting more than one wavelength of electromagnetic radiation may be used in combination to emit electromagnetic radiation 24 and provide a selected multi-modal distribution of wavelengths in the electromagnetic radiation 24 incident on the structure 10. For example, a first laser device may be configured to emit electromagnetic radiation 24 having a wavelength of about 337 nanometers, and a second laser device may be configured to emit electromagnetic radiation 24 having a wavelength of about 1064 nanometers. The electromagnetic radiation 24 emitted by the first laser device and the electromagnetic radiation 24 emitted by the second laser device may be focused so as to be coincident on the surface 16 of the structure 10. The use of a selected multi-modal distribution of wavelengths in the electromagnetic radiation 24 may mitigate damage to the structure 10 while enhancing redistribution of the contaminant matter 20.

As yet another example, a flash lamp-type device configured to emit electromagnetic radiation 24 having wavelengths in the ultraviolet and/or visible regions of the electromagnetic spectrum may be used to irradiate large areas of the surface 16 of the structure 10. Optionally, optical components (not shown) such as lenses, prisms, mirrors, and filters may be used in conjunction with a radiation-emitting device to collimate, focus, and/or filter the electromagnetic radiation 24 emitted thereby as necessary or desired.

Only a single crack 14 is illustrated in FIGS. 2A-2D for simplicity of illustration. The surface 16 of the structure 10, however, may be relatively large and may include innumerable cracks 14 and/or pores. As a result, a beam of electromagnetic radiation 24 on the surface 16 of the structure 10 may be systematically scanned, such as (by way of example only) by use of raster scanning techniques, over the surface 16 of the structure 10 to cover larger areas on the surface 16 (e.g., areas greater than about one-hundred times the surface area of the spot size of the beam of incident electromagnetic radiation 24).

As previously discussed, irradiation of the structure 10 (as shown in FIG. 2B) may cause at least some of the contaminant matter 20 within the crack 14 to be redistributed in a direction generally toward a surface 16 of the structure 10 (as shown in FIG. 2C). The mechanism by which the electromagnetic radiation 24 causes redistribution of the contaminant matter 24 is not fully understood, although it is believed that photophysical mechanisms (i.e., acoustic and thermal vibrations) and/or photochemical mechanisms (i.e., electronic transitions) may at least partly contribute to the redistribution of the contaminant matter 20.

Figure 2D:
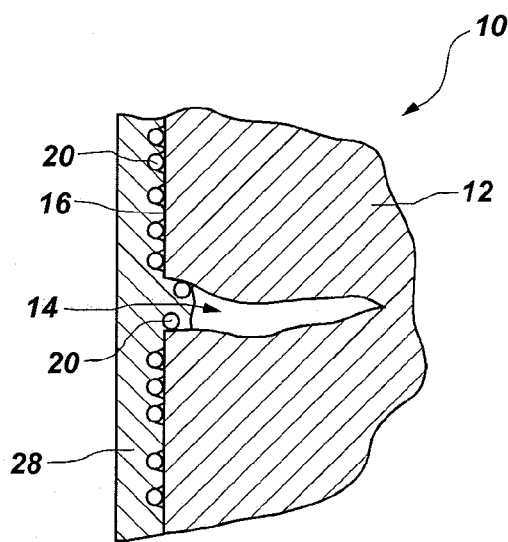

Referring to FIG. 2D, a capture material 28 may be applied to the surface 16 of the structure 10 after the structure 10 has been irradiated with electromagnetic radiation 24, as previously described. The capture material 28 may be any material that is capable of binding (chemically or physically) to the contaminant material 20, and that may be subsequently removed from the structure 10. By way of example and not limitation, the capture material 28 may include a polymer material.

As an example, the capture material 28 may include a thermoplastic polymer material such as, for example, polyethylene-based materials, polyurethane-based materials, polypropylene-based materials, polyester-based materials, polyamide-based materials, acrylic-based materials, polyvinylacetyl-based materials (such as, for example, polyvinylbutyral-based materials), polyvinylacetate-based materials, polyisoprene-based materials, styrenebutadiene-based materials, and latex-based materials. In such an embodiment, the capture material 28 may be applied to the surface 16 of the structure 10 by, for example, heating the capture material 28 to a temperature above a glass transition temperature of the capture material 28 to substantially liquefy the capture material 28, spraying droplets of the substantially liquefied capture material 28 onto the surface 16 of the structure 10, and allowing the capture material 28 as applied to cool and solidify, to form a substantially continuous layer of capture material 28 extending over at least a portion of the surface 16 of the structure 10.

As another example, the capture material 28 may include a thermoset polymer material such as, for example, silicone-based materials or epoxy-based materials. In such an embodiment, the capture material 28 may be applied to the surface 16 of the structure 10 by, for example, applying substantially liquid uncured polymer material or polymer precursor materials to the surface 16 of the structure 10, and subsequently curing the uncured polymer material or polymer precursor materials to form the capture material 28. By way of example and not limitation, the polymer materials or polymer precursor materials may be cured by applying energy in the form of heat and/or electromagnetic radiation to the precursor materials. Alternatively, the polymer precursor materials may be cured by mixing a chemical reagent with the polymer precursor materials immediately prior to application of the polymer precursor materials to the surface 16 of the structure 10, or by applying the reagent to the polymer precursor materials after application to the surface 16.

If the substantially liquid uncured polymer material or polymer precursor materials may be cured by irradiating the polymer precursor materials with electromagnetic radiation 24, the polymer precursor materials may be cured while substantially simultaneously causing redistribution of the contaminant matter 20 by irradiating the structure 10 with electromagnetic radiation 24 as discussed previously in relation to FIG. 2B.

Figure 2E:
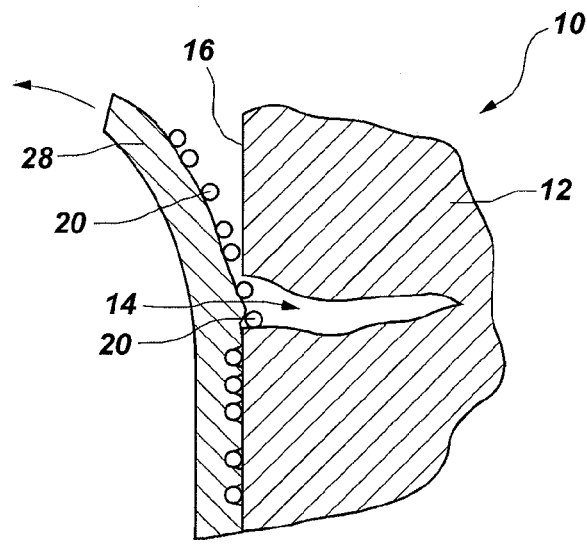

Referring to FIG. 2E, the capture material 28, together with the contaminant matter 20 captured thereby, may be removed from the surface 16 of the structure 10. By way of example and not limitation, the capture material 28 may be removed from the surface 16 of the structure 10 by peeling the capture material 28 off from the structure 10, as shown in FIG. 2E. In additional embodiments, the capture material 28 may be scraped, ground, or polished off from the surface 16 of the structure 10.

Figure 2F:
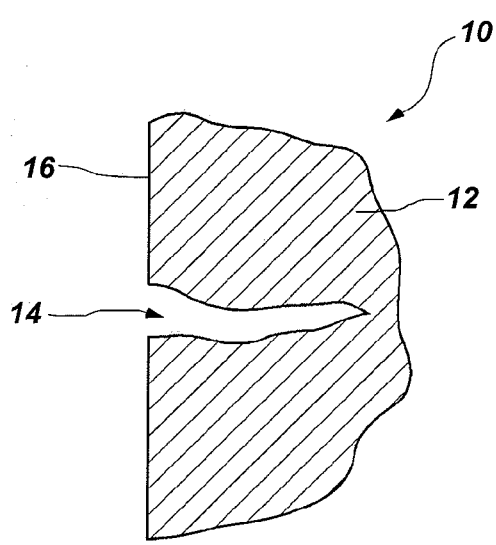

After the capture material 28 and the contaminant matter 20 have been removed from the surface 16 of the structure 10, the structure 10 may be substantially free of contaminant matter 20, as shown in FIG. 2F. If the structure 10 is not substantially free of contaminant matter 20 after a single decontamination treatment, the process may be repeated as necessary or desired until the amount of contaminant matter 20 remaining on the surface 16 of the structure 10 reaches a selected acceptable level.

Figure 3:
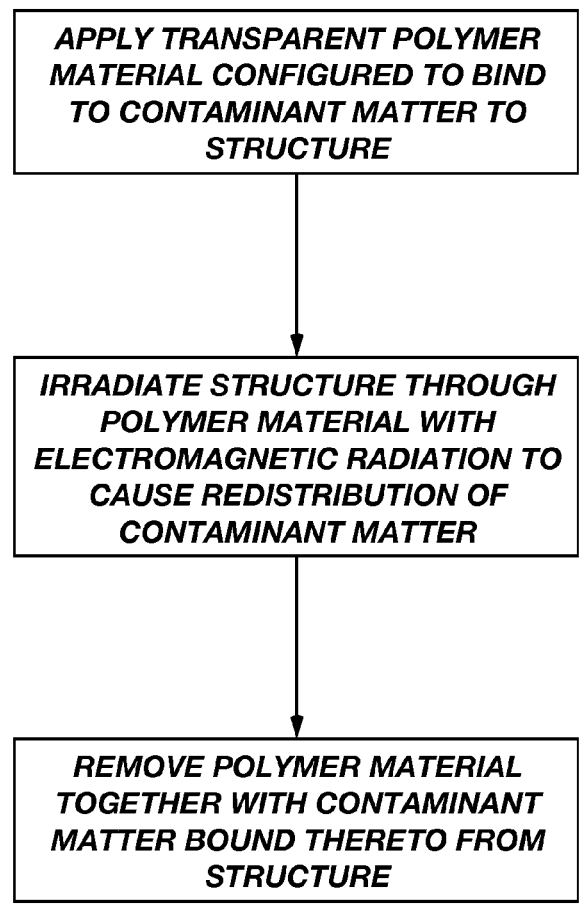
FIG. 3 is a flow chart illustrating another example of a method that embodies teachings of the present invention and that may be used to remove contaminant matter from a porous material.

Another illustrative method that embodies teachings of the present invention and that can be used to remove contaminant matter from a porous material will be described with reference to FIG. 3 and FIGS. 4A-4F. FIG. 3 is a flow chart broadly illustrating the acts of the method. As shown therein, the method involves applying a transparent polymer material that is configured to bind to a contaminant matter to a structure, irradiating the structure through the polymer material with electromagnetic radiation to cause redistribution of contaminant matter, and removing the polymer material together with contaminant matter bound thereto from the structure. This process will be described in further detail with reference to FIGS. 4A-4F. As used herein, the term "transparent" means at least partially transmissive of the intended wavelength or wavelengths of electromagnetic radiation to be subsequently applied to the structure, and is not limited to materials transparent to such radiation lying within the range visible to humans.

Figure 4A:
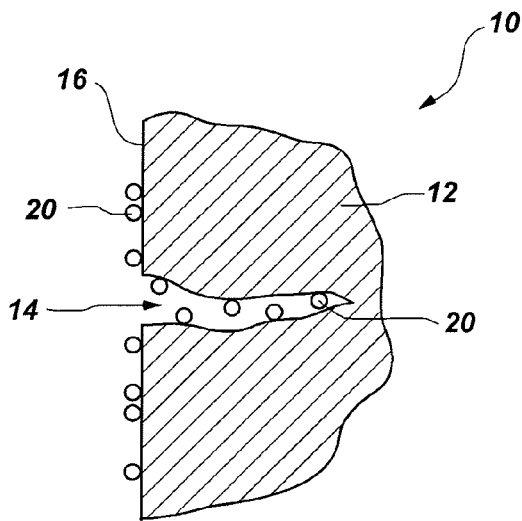
FIGS. 4A-4F illustrate an example of various acts in the process represented by the flow chart shown in FIG. 3.
Figure 4B:
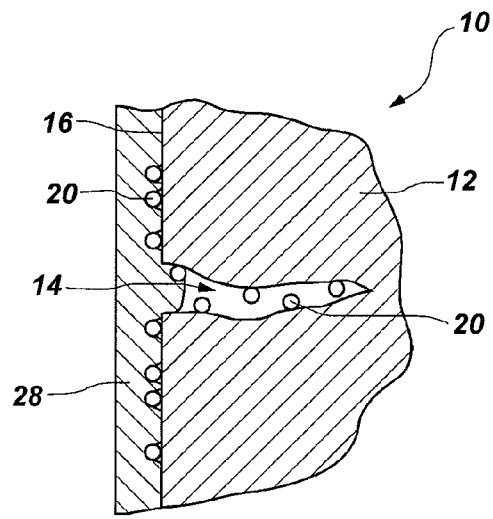
Figure 4C:
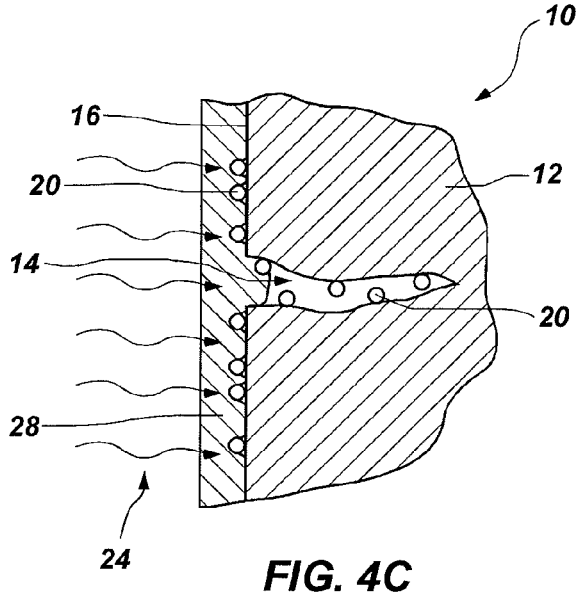

FIG. 4A is identical to the FIG. 2A previously described herein, and is a partial cross-sectional view of the structure 10, which includes a porous material 12. A crack 14 is illustrated that extends into the porous material 12 from the surface 16. Contaminant matter 20 is disposed on the surface 16 of the structure 10 and within the crack 14. A transparent capture material 28 may be applied to the surface 16 of the structure 10, as shown in FIG. 4B, after which the structure 10 may be irradiated with electromagnetic radiation 24 through the capture material 28, as shown in FIG. 4C. In this method, the capture material 28 is applied to the structure 10 prior to irradiating the structure 10 with electromagnetic radiation 24, in contrast to the method previously described herein in relation to FIGS. 2A-2F.

Figure 4D:
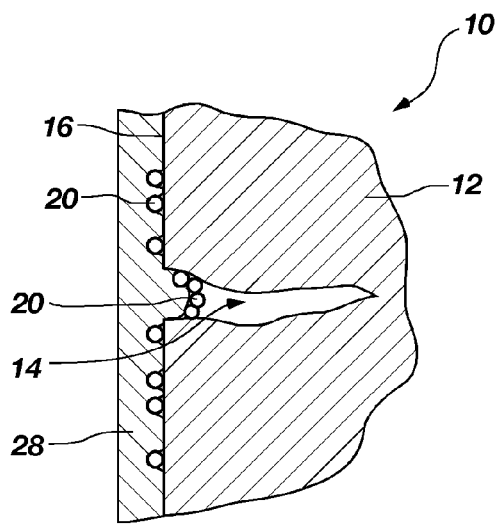
Figure 4E:
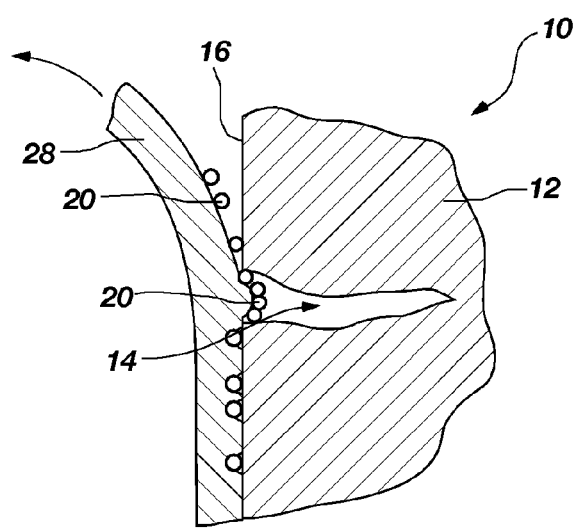
Figure 4F:
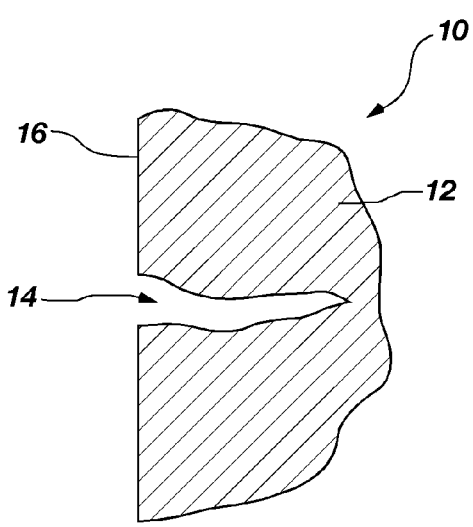

Irradiation of the structure 10, as shown in FIG. 4C, may cause at least some of the contaminant matter 20 within the crack 14 to be redistributed in a direction generally toward the surface 16 of the structure 10, as shown in FIG. 4D. The capture material 28 may bind to the contaminant matter 20. Referring to FIG. 4E, the capture material 28, together with the contaminant matter 20 captured thereby, may be removed from the surface 16 of the structure 10 as previously described herein to provide a structure 10 that is substantially free of contaminant matter 20, as shown in FIG. 4F. If the structure 10 is not substantially free of contaminant matter 20, the process may be repeated as necessary or desired until the amount of contaminant matter 20 remaining on the surface 16 of the structure 10 reaches a selected acceptable level.

In this method, a layer of the capture material 28 having a thickness of less than about one centimeter may be at least partially transparent to one or more wavelengths of electromagnetic radiation 24 incident on the structure 10.

By way of example and not limitation, the capture material 28 may include a polyphosphazine-based polymer material. For example, the polyphosphazine-based material may include a polymer or copolymer material including polyphosphazine molecular segments having a chemical structure generally represented as:

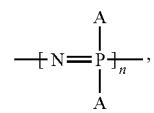

where P represents phosphorous, N represents nitrogen, and A represents a side chain group or chemical structure comprising an atom or a plurality of covalently bonded atoms. In some embodiments, the value of n may be between about 500 and about 15,000. More particularly, the value of n may be between about 6,000 and about 10,000. The alternating phosphorous-nitrogen chain may be referred to as the polyphosphazine backbone.

By way of example and not limitation, the side chain groups A may include, for example, Cl, F, Br, $OC_nH_{2n+1}$ (where n is an integer between 1 and about 10), $OCH_2CF_3$, $NHCH_3$. Furthermore, one or more of the species of side chain groups A may provide a cross-link to another polyphosphazine backbone.

Moreover, one or more of the side chain groups A may include a functional group selected to perform one or more of the following functions: bind to the contaminant matter 20, bind to the porous material 12, and impart selected physical properties (such as, for example, elasticity) to the capture material 28 to facilitate removal of the capture material 28 from the porous material 12. Such functional groups may include, for example, primary amines, secondary amines, tertiary amines, iminos, oximes, carboxylates, sulfonates, β-diketones, phosphine sulfides, phosphates, phosphites, phosphonates, phosphinates, phosphine oxides, monothio phosphinic acids, and dithio phosphinic acids. In terms of chemical structures, such functional groups may have chemical structures selected from the following group:

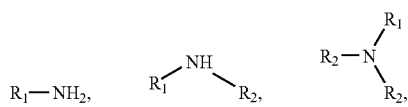

-continued

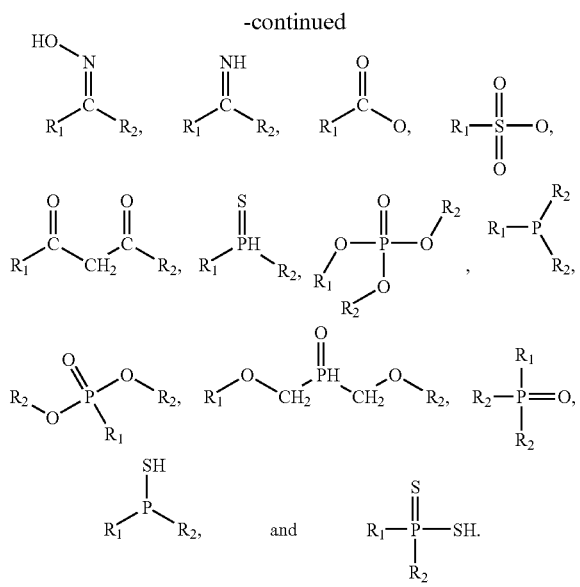

In the above-illustrated functional groups, the $R_1$ groups may be a phosphorous atom of a polyphosphazine backbone or one or more atoms providing a covalently bonded link to a phosphorous atom of a polyphosphazine backbone. The $R_2$ groups may include any additional chemical structure, and may include, for example, an alkyl group. In additional embodiments, some $R_2$ groups may also include one or more atoms providing a covalently bonded link to a phosphorous atom of a polyphosphazine backbone. In such configurations, the functional groups may comprise portions of chemical structures providing cross-links between different polyphosphazine backbones.

If the functional groups are configured to bind to the porous material 12, the functional groups may be configured to promote hydrogen bonding between the capture material 28 and the porous material 12. For example, the functional groups may include hydrogen atoms and/or chlorine, fluorine, or bromine atoms to promote hydrogen bonding between the capture material 28 and the porous material 12.

Various methods known in the art may be used to synthesize polyphosphazine materials. By way of example and not limitation, the macromolecular substitution method may be used to synthesize such polyphosphazine materials. The macromolecular substitution method involves forming hexachlorocyclotriphosphazene from phosphorous pentachloride and ammonium chloride, heating the hexachlorocyclotriphosphazene to a temperature of greater than about 250° C. to form poly(dichlorophosphazene), and replacing the chlorine atoms of the poly(dichlorophosphazene) with the organic or organometallic side groups R. In additional methods, poly(difluorophosphazene) may be used instead of, or in addition to poly(dichlorophosphazene) when forming polyphosphazine materials for use according to the present invention.

The capture material 28 may be selectively tailored to exhibit one or more desired physical properties. For example, the capture material 28 may be configured to exhibit between about 70 and about 1,500 percent elongation at failure of when tested in accordance with ASTM (American Society for Testing and Materials) standard D638-03, entitled Standard Test Method for Tensile Properties of Plastics. As another example, the capture material 28 may be selectively tailored such to exhibit a maximum tensile strength at break in a range extending from about 1.0 megapascals (MPa) to about 60.0 megapascals (MPa) when tested in accordance with ASTM (American Society for Testing and Materials) standard D638-03, entitled Standard Test Method for Tensile Properties of Plastics. Other techniques for determining the maximum tensile strength of a material using commercially available material testing machines are also known in the art. As yet another example, the capture material 28 may be selectively tailored to exhibit a pull index, with respect to a particular porous material 12 to be treated, in a range extending from about 40 $cm^{-1}$ to about 200 $cm^{-1}$. More particularly, the capture material 28 may be selectively tailored to exhibit a pull index, with respect to a particular porous material 12 to be treated, in a range extending from about 60 $cm^{-1}$ to about 100 $cm^{-1}$. The pull index of the capture material 28 may be defined as the maximum tensile strength at break of the capture material 28 divided by the adhesion force of the capture material 28 with respect to the particular porous material 12 to be treated.

Figure 5A:
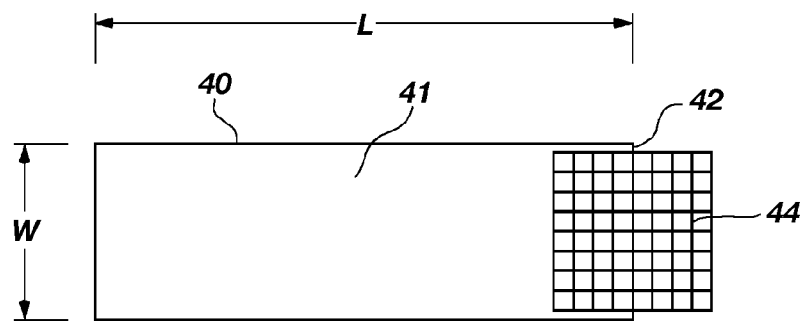
FIGS. 5A-5D illustrate an example of a method that may be used to determine the adhesion force of a material with respect to a particular porous material to be decontaminated.
Figure 5B:

An example of a method for determining the adhesion force of the capture material 28 with respect to the particular porous material 12 to be treated, which is performed using a commercially available material testing machine (such as those sold by Instron of Norwood, Mass.), will now be described with reference to FIGS. 5A-5D. FIG. 5A is a top plan view of a sample or block 40 of the particular porous material 12 to be treated, which is used to determine the adhesion force of the capture material 28 with respect to the particular porous material 12. FIG. 5B is a side view of the block 40. As seen in FIGS. 5A and 5B, the block 40 has a substantially planar test surface 41. The test surface 41 is substantially rectangular, having a length L and a width W. The length L is 7.62 cm (3 in.), and the width W is 2.54 cm (1 in.). A piece of mesh material 44 comprising, for example, nylon, is temporarily adhered (using a low-strength adhesive material) to the test surface 41 at an end of the block 40, such that about half of the piece of mesh material 44 extends laterally beyond a side surface 42 of the block 40. The piece of mesh material 44 is substantially square, having side lengths of about 2.54 cm (1 in.).

Figure 5C:
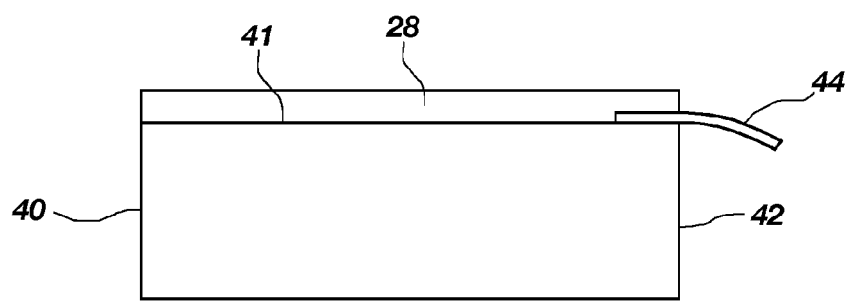
Figure 5D:
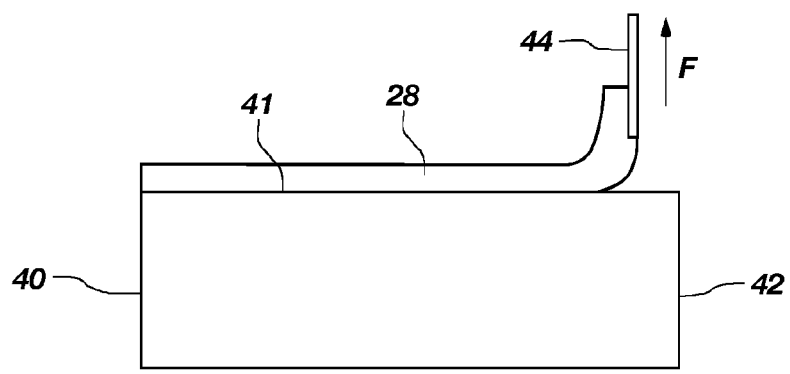

Referring to FIG. 5C, a capture material 28 then may be applied to the test surface 41 of the block 40, including over the portion of the piece of mesh material 44 that overlies the test surface 41, such that the capture material 28 penetrates into the mesh material 44. Referring to FIG. 5D, one set of grips or a clamp of the testing machine may be secured to the block 40, and another set of grips or a second clamp of the testing machine may be secured to the portion of the piece of mesh material 44 that extends laterally beyond the side surface 42 of the block 40. The testing machine may be caused to pull the piece of mesh material 44 (and the capture material 28 attached thereto) in a direction substantially perpendicular to the planar test surface 41, as indicated by the directional arrow F in FIG. 5D, at a rate of about 5.0 cm per minute while measuring the force acting on the load cell of the testing machine. The stress-strain curve may be generated and plotted from the collected data. The adhesion force of the capture material 28 with respect to the particular porous material 12 (FIG. 2A) to be treated may be defined as the average of the force in the "plateau" region of the resulting stress-strain curve (i.e., the region of generally constant force relative to other regions of the stress strain curve (such as the end portions of the stress-strain curve)), divided by the width W of block 40 (FIG. 5A) (assuming that the capture material 28 extends over the entire test surface 41 of the block 40). If necessary or desired, this process may be repeated a number of times (up to about 30) using substantially identical samples, so as to determine the adhesion force of the capture material 28 with respect to the particular porous material 12 with a satisfactory statistical confidence level.

Figure 6:
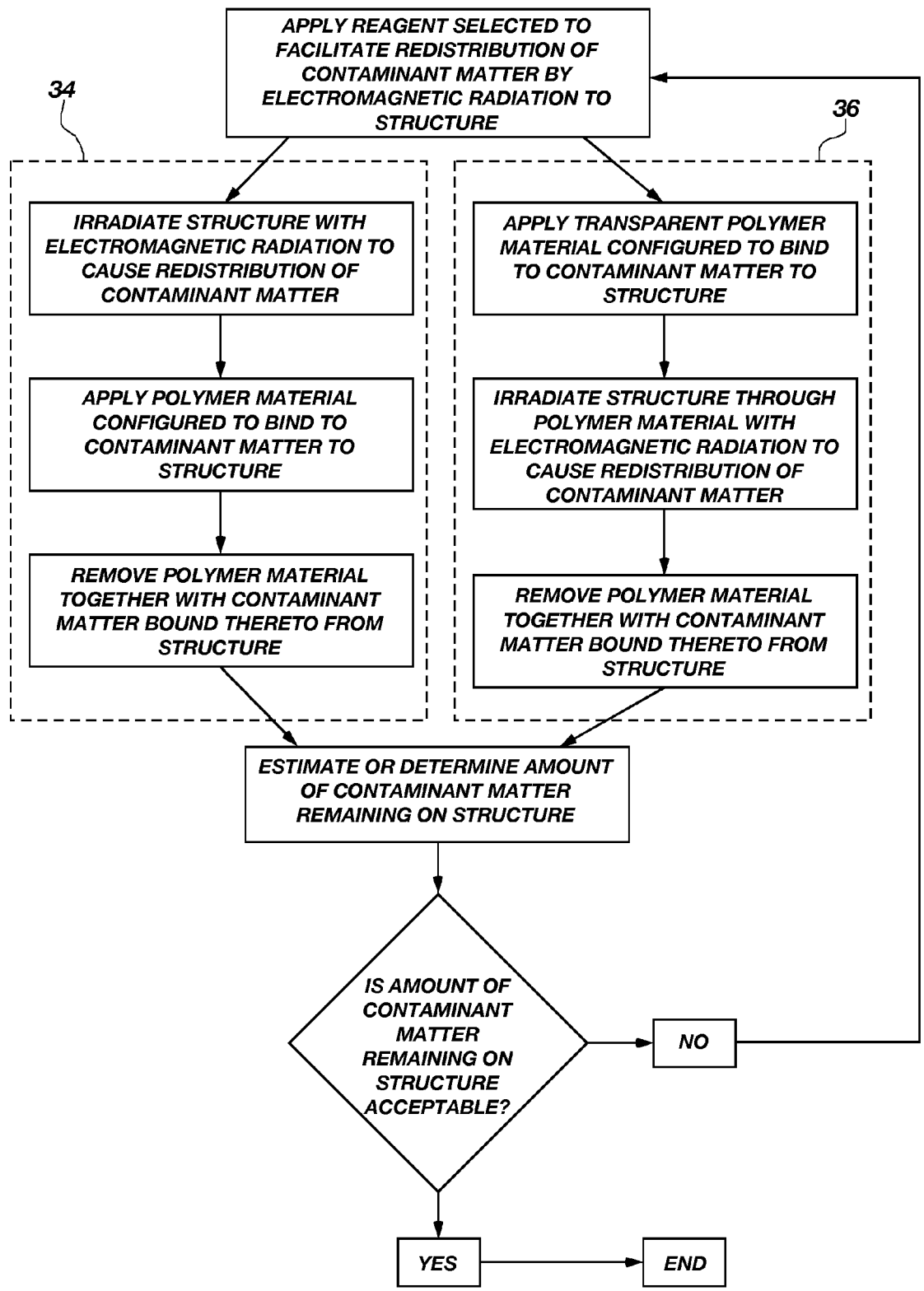
FIG. 6 is yet another flow chart illustrating additional methods that embody teachings of the present invention and that may be used to remove contaminant matter from a porous material.

FIG. 6 is another flow chart generally illustrating additional methods for removing contaminant matter 20 from a porous material 12 that embody teachings of the present invention. In FIG. 6, the process illustrated in the flow chart of FIG. 1 is contained within the dashed line 34, and the process illustrated in the flow chart of FIG. 3 is contained within the dashed line 36.

As shown in FIG. 6, a reagent optionally may be applied to a structure 10 prior to performing the method previously described in relation to FIGS. 2A-2F or the method previously described in relation to FIGS. 4A-4F. The reagent may facilitate redistribution of the contaminant matter 20 by forming complexes with the contaminant matter 20 that are more susceptible to redistribution relative to the contaminant matter 20 alone. By way of example and not limitation, such a reagent may include one or more of 1-methoxy-2-(2-methoxyethoxy)ethane(diglyme), sodium borohydride, and β-diketones (such as, for example pentane-2,4-dione(acetylacetone), acetonylacetone, trifluoroacetylacetone, hexafluoroacetylacetone, thienoyltrifluoroacetylacetone, and 2,2-dimethyl-6,6,7,7,8,8,8-heptafluoro-3,5-octanedione and 2,2,6,6-tetramethylheptane-3,5-dione).

In some instances, after the capture material 28 and the contaminant matter 20 have been removed from the surface 16 of the structure 10 as previously discussed herein, at least some contaminant matter 20 may remain on the surface 16 and/or within the cracks 14 of the structure 10. In such instances it may be necessary or desirable to repeat the processes previously described herein one or more times in order to ensure that the surface 16 of the structure 10 is substantially free of contaminant matter 20, as shown in FIG. 2F and FIG. 4F.

As shown in FIG. 6, after performing the process previously described in relation to FIGS. 2A-2F or the process previously described in relation to FIGS. 4A-4F, the amount of contaminant matter 20 remaining on the surface 16 or in the cracks 14 of the porous material 12 optionally may be estimated or determined. By way of example and not limitation, the amount of contaminant matter 20 remaining on the surface 16 or in the cracks 14 of the porous material 12 may be estimated or determined by detecting contaminant matter 20 remaining on or in the porous material 12. For example, chemical analysis techniques known in the art may be used to detect contaminant matter 20 remaining on or in the porous material 12. In additional embodiments, the amount of contaminant matter 20 bound to the capture material 28 may be detected after removing the capture material 28 from the structure 10. The process described in relation to FIGS. 2A-2F or the process previously described in relation to FIGS. 4A-4F may be repeated until the amount of contaminant matter 20 detected on or in the porous material 12, or in the capture material 28 removed from the structure 10, has been reduced to a selected level.

Figure 7:
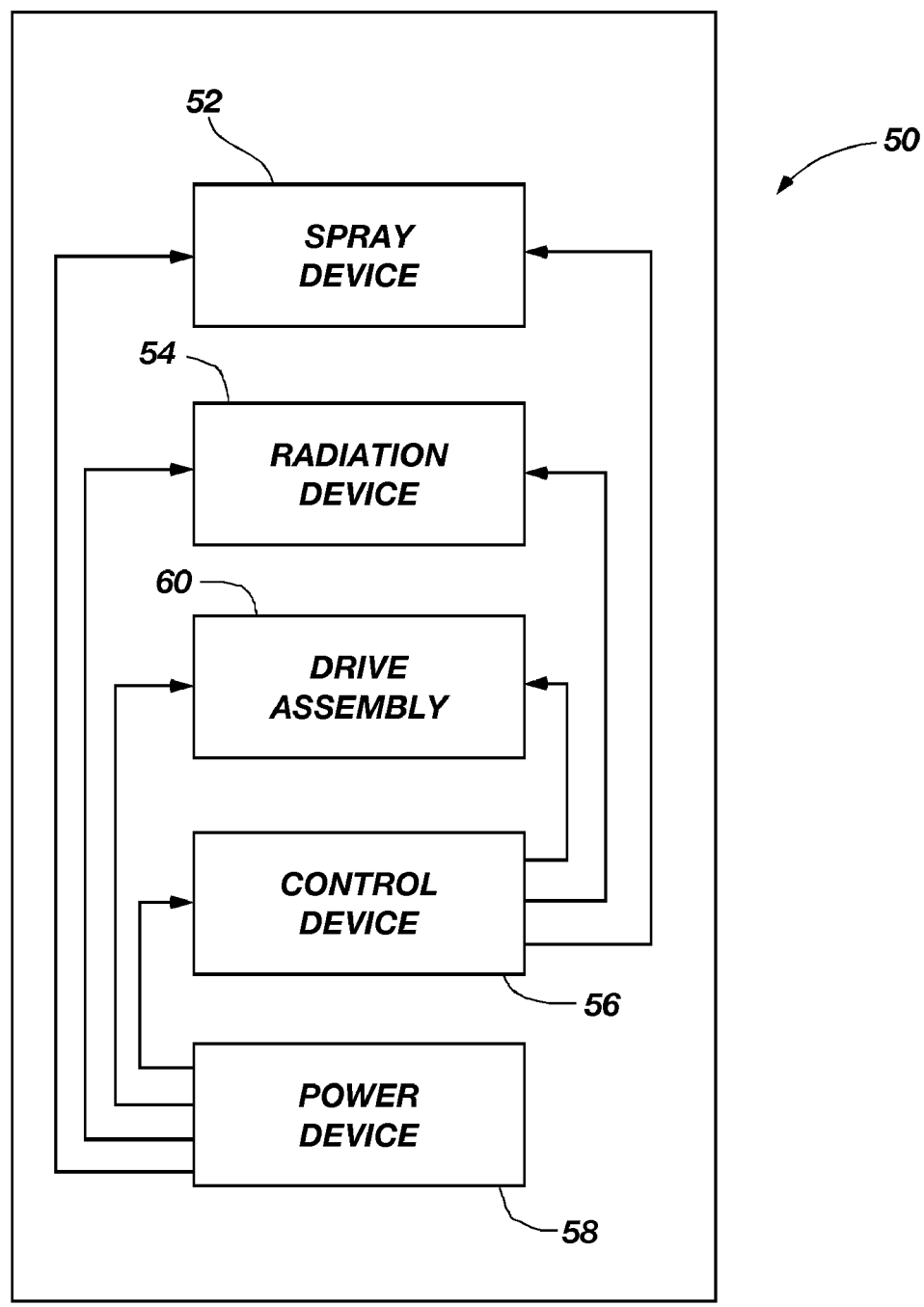
FIG. 7 is a schematic diagram of a decontamination system that embodies teachings of the present invention.

The methods for decontaminating a structure 10 previously described herein may be at least partially carried out using a decontamination system 50 schematically illustrated in FIG. 7, which embodies teachings of the present invention. As seen in FIG. 7, the decontamination system 50 may include at least one spray device 52 configured to apply capture material 28 to a surface 16 of a structure 10 that includes porous material 12 (FIG. 2A). For example, the spray device 52 may be configured to spray a substantially liquid polymer capture material 28, or polymer precursor materials used to form a capture material 28, on a surface 16 of a structure 10. The spray device 52 may include a container (not shown) for holding substantially liquid polymer capture material 28, or precursor materials used to form capture material 28, a pump (not shown) for pressurizing the liquid within the container, and a spray nozzle (not shown) configured to direct the liquid onto the surface 16 of a structure 10. Optionally, the spray device 52 may further include one or more heating elements configured to maintain the liquid at or above a selected temperature while the liquid is within the container, the spray nozzle, and/or fluid supply lines or hoses extending therebetween.

The decontamination system 50 optionally may include an additional spray device 52 configured to apply a chemical reagent that facilitates redistribution of contaminant matter 20 to a surface 16 of a structure 10 (FIG. 2A) prior to applying a capture material 28 to the surface 16 of the structure 10. In other embodiments, the decontamination system 50 may include a single spray device 52 that is configured to selectively apply both a chemical reagent that facilitates redistribution of contaminant matter 20 and a capture material 28 to a surface 16 of a structure 10 (FIG. 2A).

The decontamination system 50 may further include at least one radiation device 54 configured to irradiate a surface 16 of a structure 10 that includes porous material 12 (FIG. 2A). By way of example and not limitation, the radiation device 54 may include a laser device configured to emit a beam of substantially coherent electromagnetic radiation 24 (FIG. 2B). In additional embodiments, the decontamination system 50 may include a plurality of radiation devices 54, each configured to emit a beam of substantially coherent electromagnetic radiation 24 having a unique wavelength or wavelengths to provide a selected multi-modal distribution of electromagnetic radiation 24.

The decontamination system 50 may include at least one control device 56 configured to selectively control the various other components of the decontamination system 50, such as, for example, the spray device 52 and the radiation device 54. The control device 56 may include, for example, at least one electronic signal processor device (not shown), at least one memory device (not shown), and at least one input device (not shown) for receiving commands from a person operating the system 50, as well as from sensors indicating proximity to a contaminated surface or a temperature thereof, etc. By way of example and not limitation, the control device 56 may include a computer device such as a personal computer (i.e., a desktop computer or a laptop computer), a programmable logic controller, or an electronic control unit configured to receive commands from another control device (not shown) disposed at a remote location via electrical wires extending therebetween or using any wireless technology known in the art (e.g., signals carried by electromagnetic radiation). Remote operation of the decontamination system 50 may be desirable in situations in which the nature of the contaminant matter 20 renders local operation of the decontamination system 50 unsafe for decontamination personnel. In such a configuration, the decontamination system 50 may further include a camera device (not shown) or other sensors, such term including global positioning system (GPS) sensors and associated transmitters configured to provide visual or other feedback regarding the location and orientation of the decontamination system 50 to facilitate remote operation and control thereof by decontamination personnel.

The decontamination system 50 may include a power device 58 configured to supply electrical power as necessary or desired to the various other components of the decontamination system 50, such as, for example, the spray device 52, the radiation device 54, and the control device 56. By way of example and not limitation, the power device 58 may include one or more batteries, an electrical generator, or a device configured to connect to an existing power supply grid.

At least a portion of the decontamination system 50 may be mounted to a vehicle 62 such as a truck, tractor, tractor trailer, all-terrain vehicle, remotely operated robotic device, etc., and the decontamination system 50 optionally may include a drive assembly 60. The drive assembly 60 may include a combustion engine or electrical motor configured to drive one or more wheels or a track assembly for moving the vehicle 62 relative to the ground or other surface. If the drive assembly 60 includes an electrical motor, electrical power may be supplied to the electrical motor by the power device 58 or a different power device dedicated solely to the drive assembly 60.

Figure 8:
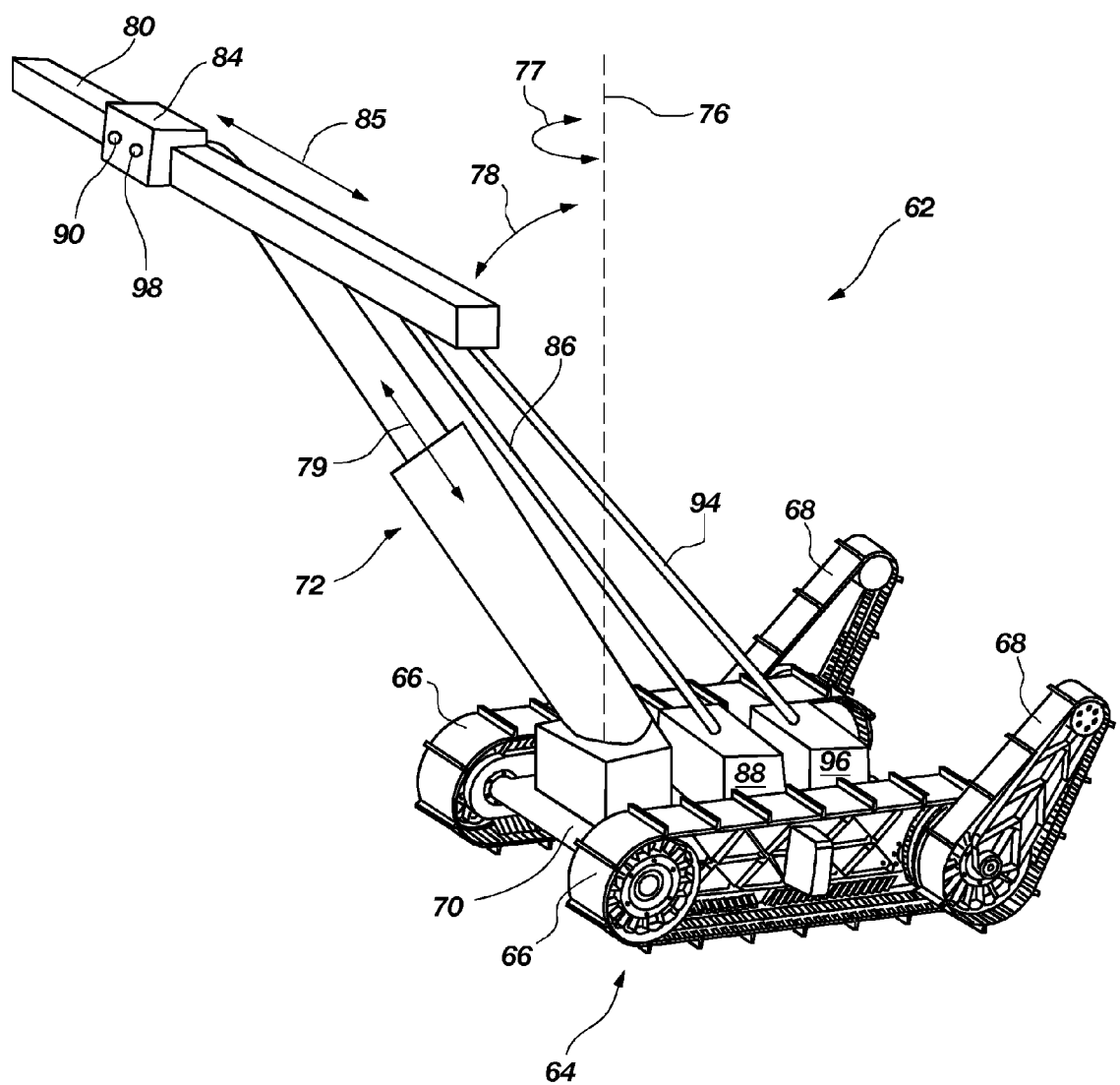
FIG. 8 illustrates a robotic vehicle on which a decontamination system that embodies teachings of the present invention is mounted.

By way of example and not limitation, the decontamination system 50 may be mounted to a remotely operated robotic vehicle 62, such as the vehicle 62 shown in FIG. 8. The vehicle 62 may include a robotic platform 64, such as that described in detail in U.S. Pat. No. 6,431,296 to Won, the disclosure of which is incorporated herein in its entirety by this reference. Briefly, the robotic platform 64 may include a primary wheel and track system that includes a first set of tracks 66 for propelling the robotic platform 64 along the ground or other surface, and a second wheel and track system that includes a second set of tracks 68 to facilitate maneuvering of the robotic platform 64 over or relative to obstacles, such as steps and stairs. In additional embodiments, the robotic platform 64 may include a plurality of wheels configured to propel the robotic platform 64 relative to the ground, instead of the tracks 66 and tracks 68.

The robotic platform 64 may include a main body 70 (which may include a frame and/or a platform) on which a decontamination system 50 (FIG. 7) may be mounted. In other words, the spray device 52, radiation device 54, control device 56, power device 58, and the drive assembly 60 previously described herein with reference to FIG. 7 may be mounted on, or otherwise structurally coupled to, the main body 70 of the robotic platform 64. The location and orientation of the spray device 52 and radiation device 54 may, of course, be dictated by the surfaces intended to be decontaminated. For example, decontamination of horizontal surfaces such as roadways may be effected by a spray device 52 and radiation device 54 suspended beneath robotic platform 64.

As shown in FIG. 8, a robotic arm 72 may be structurally coupled to the robotic platform 64. The robotic arm 72 may be configured to move in one or more directions relative to the main body 70 of the robotic platform 64. By way of example and not limitation, the robotic arm 72 may be configured to rotate about the vertical axis 76 relative to the main body 70 of the robotic platform 64 in the directions illustrated by directional arrow 77. The angle of inclination 78 of the robotic arm 72 (i.e., the angle between the vertical axis 76 and a longitudinal axis (not shown) of the robotic arm 72) also may be selectively adjustable. Furthermore, the robotic arm 72 may be configured to selectively extend or retract in a linear direction 79 along a longitudinal axis of the robotic arm 72. In additional embodiments, the robotic arm 72 may comprise an articulated robotic arm configured to selectively move in three dimensions relative to the main body 70 of the robotic platform 64.

Optionally, a generally laterally extending cross-bar 80 may be attached to an end of the robotic arm 72, as shown in FIG. 8. In such a configuration, a spray unit 84 of the spray device 52 (FIG. 7) may be mounted on the cross-bar 80 and configured to selectively slide in the lateral direction thereon, as illustrated by the directional arrow 85. Supply lines or hoses 86 may be used to transport liquid for forming capture material 28 (FIG. 2D) from a liquid holding tank 88 to an injection nozzle or port 90 on the spray unit 84. In this configuration, spraying of capture material 28 onto the walls and/or roofs of buildings or other structures may be facilitated.

At least a portion of the radiation device 54 (FIG. 7) also may be mounted on the robotic arm 72 to facilitate irradiating the walls and/or roofs of buildings or other structures with electromagnetic radiation 24, as previously discussed herein. For example, fiber optic cables 94 may be used to transport electromagnetic radiation 24 (FIG. 2B) emitted by a laser device 96 mounted to an additional port 98 on the spray unit 84, from which the electromagnetic radiation 24 may be emitted towards a surface of a structure to be decontaminated. As shown in FIG. 8, the laser device 96 may also be mounted on the main body 70 of the robotic platform 64.

To decontaminate a structure 10 that includes a porous material 12, the vehicle 62 may be remotely controlled by an operator from a remote location. The robotic platform 64 may be driven to a location proximate the contaminated structure 10, and the structure 10 may be decontaminated using methods that embody teachings of the present invention, such as, for example, the methods illustrated in the flow charts of FIG. 1, FIG. 3, and FIG. 6. For example, a capture material 28 may be applied to a selected area on a surface 16 of the structure 10, as previously described in relation to FIG. 4B, using the nozzle or port 90 on the spray unit 84, hoses 86, liquid holding tank 88, and a pump (not shown) for pressurizing the liquid in one or more of the spray unit 84, hoses 86, and tank 88. By remote operation, the spray unit 84 may be selectively slid along the cross-bar 80, and the robotic arm 72 may be selectively maneuvered such that the selected area on the surface 16 of the structure 10 has been sufficiently coated with capture material 28.

The selected area on the surface 16 of the structure 10 then may be irradiated with electromagnetic radiation 24, as previously described in relation to FIG. 4C, using the additional port 98 on the spray unit 84, fiber optic cables 94, and the laser device 96. Again, the spray unit 84 may be selectively slid along the cross-bar 80, and the robotic arm 72 may be selectively maneuvered, such that the selected area on the surface 16 of the structure 10 has been sufficiently irradiated with electromagnetic radiation 24, by remote operation.

After the structure 10 has been coated with capture material 28 and irradiated with electromagnetic radiation 24 to cause redistribution of contaminant matter 20, decontamination personnel may remove the capture material 28 together with contaminant matter 20 bound thereto using any of the methods previously described herein. In some embodiments, the vehicle 62 may be equipped with means for removing the capture material 28 from the structure 10. For example, at least one additional robotic arm (not shown) having a clamping or gripping member on an end thereof may be mounted on the robotic platform 64. The additional robotic arm may be configured to clamp onto or grip capture material 28 after it has been applied to a surface 16 of a structure 10, and to peel or tear the capture material 28 off from the surface 16 of the structure 10.

In additional embodiments, it may not be necessary or desirable to remotely control and operate the vehicle 62, the vehicle 62 may be configured to be driven and controlled by an operator riding thereon or within a sealed operator compartment therein.

In additional embodiments, a decontamination system 50 (FIG. 7) may be mounted on an apparatus that is capable of decontaminating the walls and surfaces of buildings or other structures that are too high to be reached using a robotic arm of a vehicle, such as the robotic arm 72 of the vehicle 62 shown in FIG. 8. For example, a decontamination system 50 may be mounted on a frame or structure that can be suspended by cables from the roof of a building, mounted on scaffolding secured adjacent a building, or otherwise positioned adjacent walls or other generally vertical surfaces. Such an apparatus also may be remotely operated and configured to selectively "crawl" or move along the walls or other generally vertical surfaces of buildings or structures and used to decontaminate the buildings or structures using methods that embody teachings of the present invention, such as those previously described herein.

Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A polyphosphazine-based polymer material comprising a plurality of polyphosphazine backbones having a chemical structure represented as

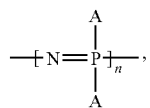

where N is nitrogen, P is phosphorous, n is an integer between about 500 and about 15,000, and A is a chemical structure comprising at least one functional group having a chemical structure represented by at least one of

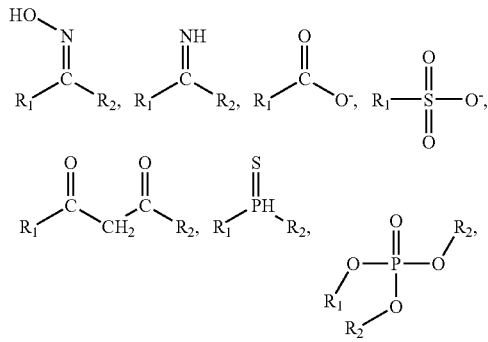

-continued

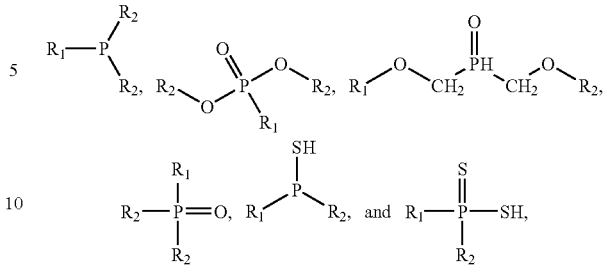

wherein $R_1$ comprises a phosphorous atom of a polyphosphazine backbone or a plurality of atoms providing a covalently bonded link to a phosphorous atom of a polyphosphazine backbone, and wherein $R_2$ comprises additional chemical structure.

2. The polyphospazine-based polymer material of claim 1, wherein n is an integer between about 6,000 and about 10,000.

3. The polyphospazine-based polymer material of claim 1, wherein a film of the polyphosphazine-based polymer material having a thickness of less than about one centimeter is substantially transparent to at least one wavelength of radiation in a range extending from about 200 nanometers to about 25 centimeters.

4. The polyphosphazine-based polymer material of claim 1, wherein the polyphosphazine-based polymer material is configured to exhibit an average pull index with respect to a material to which it is applied in a range extending from about 40 cm$^{-1}$ to about 200 cm$^{-1}$.

5. The polyphosphazine-based polymer material of claim 4, wherein the polyphosphazine-based polymer material is configured to exhibit an average pull index with respect to a material to which it is applied in a range extending from about 60 cm$^{-1}$ to about 100 cm$^{-1}$.

6. The polyphosphazine-based polymer of claim 1, wherein the polyphosphazine-based polymer material exhibits a maximum tensile strength in a range extending from about 1 MPa to about 60 MPa.

7. The polyphosphazine-based polymer material of claim 1, wherein $R_2$ comprises an alkyl group.

8. The polyphosphazine-based polymer material of claim 1, wherein $R_2$ comprises a phosphorous atom of a polyphosphazine backbone or a plurality of atoms providing a covalently bonded link to a phosphorous atom of a polyphosphazine backbone.

9. The polyphosphazine-based polymer material of claim 1, wherein the polyphosphazine-based polymer material comprises a copolymer material.

* * * * *